US010860313B2

(12) United States Patent
Monet et al.

(10) Patent No.: US 10,860,313 B2
(45) Date of Patent: Dec. 8, 2020

(54) METHOD FOR IMPROVED AUTOMATED SOFTWARE UPDATE UPON DEPLOYMENT OF A NETWORKING APPARATUS (71) Applicant: OVH, Roubaix (FR)

(72) Inventors: Maxime Monet, Frasnoy (FR); Louis Declerfayt, Croix (FR); Nicolas Cyrille Dante Piatto, Lille (FR); Xavier Hardy, Dublin (IE); Adrien Delbecq, Lille (FR)

(73) Assignee: OVH, Roubaix (FR)

( * ) Notice: Subject to any disclaimer, the term of this patent is extended or adjusted under 35 U.S.C. 154(b) by 0 days.

(21) Appl. No.: 16/540,129

(22) Filed: Aug. 14, 2019

(65) Prior Publication Data
US 2020/0065091 A1   Feb. 27, 2020

(30) Foreign Application Priority Data
Aug. 27, 2018   (EP) .................... 18315023

(51) Int. Cl.
G06F 8/71      (2018.01)
G06F 8/10      (2018.01)
G06F 9/445     (2018.01)
G06F 8/65      (2018.01)

(52) U.S. Cl.
CPC .................. *G06F 8/71* (2013.01); *G06F 8/10* (2013.01); *G06F 8/65* (2013.01); *G06F 9/44505* (2013.01)

(58) Field of Classification Search
CPC ..... G06F 8/71; G06F 8/10; G06F 8/65; G06F 9/44505
See application file for complete search history.

(56) References Cited

U.S. PATENT DOCUMENTS

| 9,286,047 B1 | 3/2016 | Avramov et al. |
| 10,289,401 B1* | 5/2019 | Gerraty ................. G06F 9/4406 |
| 10,579,361 B1* | 3/2020 | Gerraty ................... H04L 67/34 |
| 2005/0132331 A1* | 6/2005 | Wood .................. H04L 41/0873 717/121 |
| 2007/0294686 A1* | 12/2007 | Oh .......................... G06F 8/658 717/168 |
| 2009/0165099 A1 | 6/2009 | Eldar et al. |
| 2011/0173601 A1* | 7/2011 | de los Reyes .......... G06F 8/658 717/169 |

(Continued)

OTHER PUBLICATIONS

European Search Report with regard to the counterpart EP Patent Application No. 18315023.4 dated Feb. 25, 2019.

Primary Examiner — Phillip H Nguyen
(74) Attorney, Agent, or Firm — BCF LLP (57) ABSTRACT A method and a system for deploying in a datacenter connected to a network a networking apparatus equipped with Auto Provisioning Mode capability, and having an installed version of operating system and associated packages. The method comprises the steps of: a- defining a targeted version of operating system and associated packages qualified for the datacenter; b- maintaining a range of available and supported operating system versions, including the targeted version of operating system, and associated packages; c- connecting to the network, and powering-on the networking apparatus; and d- comparing the version of operating system installed on the networking apparatus with the targeted version of the operating system.

20 Claims, 5 Drawing Sheets

(56) References Cited

U.S. PATENT DOCUMENTS

| | | | |
|---|---|---|---|
| 2012/0079471 A1* | 3/2012 | Vidal | G06F 8/65 717/169 |
| 2012/0222025 A1* | 8/2012 | Pandit | G06F 8/658 717/170 |
| 2015/0220322 A1* | 8/2015 | Brown | G06F 8/61 717/168 |
| 2016/0112252 A1 | 4/2016 | Notari | |
| 2016/0170735 A1* | 6/2016 | Kuo | H04L 67/34 717/169 |
| 2017/0094034 A1* | 3/2017 | Banerjee | H04L 69/164 |
| 2017/0329594 A1* | 11/2017 | Huang | H04L 9/3226 |
| 2019/0079746 A1* | 3/2019 | Thomas | G06F 8/61 |

* cited by examiner

METHOD FOR IMPROVED AUTOMATED SOFTWARE UPDATE UPON DEPLOYMENT OF A NETWORKING APPARATUS

CROSS-REFERENCE

The present application claims priority from European Patent Application No. 1 831 5023.4 filed on Aug. 27, 2018, the entirety of which is incorporated herein by reference.

FIELD

The present technology relates to a method for improved automated updating to a desired version, of the software originally installed on a networking apparatus, upon such networking apparatus being deployed in a datacenter.

BACKGROUND

In today's datacenter, networking apparatus, such as routers and switches, are being deployed at a rate that essentially matches the rate of expansion of the datacenter. «Datacenter» as used herein, is not limited to the infrastructure located within physical boundaries of one server farm, but rather comprises all infrastructure, whether local or remote, that an organization deploys, controls and maintains to provide services based on computer clustering, for its own internal consumption or that of other organizations. Before any networking apparatus may become operational in such a datacenter, it needs to have software, including operating system, packages and configuration, installed with a version that has been qualified for the datacenter.

Deployed networking apparatus, coming out of factory or refurbished, however are not necessarily pre-loaded with the software version that has been qualified for the datacenter.

The latest networking apparatus routinely feature a capability for automated and centralized software provisioning and configuration. This capability however finds its limits when it is not feasible, in one pass, to upgrade/downgrade the pre-loaded software to the qualified software, because for example of compatibility issues between software versions: in such cases, a manual intervention is required for those affected among the deployed networking apparatus, thus undermining the efficiency and security presumably brought about by a large-scale fully automated provisioning and configuration.

There is therefore a need for a method and system for improved software update upon deployment of the latest networking apparatus.

SUMMARY

Various implementations of the present technology provide a method of deploying in a datacenter connected to a network a networking apparatus equipped with Auto Provisioning Mode capability, and having an installed version of operating system and associated packages, comprising the steps of:

a- defining a targeted version of operating system and associated packages qualified for the datacenter;
b- maintaining a range of available and supported operating system versions, including the targeted version of operating system, and associated packages;
c- connecting to the network, and powering-on the networking apparatus;
d- comparing the version of operating system installed on the networking apparatus with the targeted version of the operating system:
  (i) if the installed version of operating system matches the targeted version of the operating system:
    verifying that the list of names of installed packages matches exactly the list of names of packages associated with the targeted version of operating system and qualified for the datacenter, and if not, installing packages associated with the targeted version of the operating system, rebooting the networking apparatus in Auto Provisioning Mode and repeating step d-, otherwise rebooting the networking apparatus in operational mode within the datacenter;
  (ii) if the installed version of operating system is newer than the targeted version of the operating system: installing on the networking apparatus the next version down of operating system within the range of supported operating systems, rebooting the networking apparatus in Auto Provisioning Mode and repeating step d-; and
  (iii) if the installed version of operating system is older than the targeted version of the operating system: installing on the networking apparatus the next version up of operating system within the range of supported operating systems, rebooting the networking apparatus in Auto Provisioning Mode and repeating step d-.

In an embodiment of the present technology, the step d- described above further includes the step between the steps d-(i) and d-(ii):
  (i') if the installed version of operating system is newer than the newest version of operating system within the range of supported operating systems, stopping the deployment method and setting networking apparatus in non-operational mode within the datacenter.

In another embodiment, the networking apparatus implements semantic versioning of operating systems, with version numbers comprising several categories, one of which being a major, and comparison of versions is done category by category; in that case, a newer version in step d-(i') described above is a version which has a number in the major category which is higher than the number in the major category of the newest version of operating system within the range of supported operating systems.

In yet another embodiment, step d- described above is executed by a script file loaded onto the networking apparatus.

In yet another embodiment, the step, described above, of rebooting the networking apparatus in operational mode includes loading onto the networking apparatus a configuration file for a configuration qualified for the datacenter.

In yet another embodiment, a deployment API and a server are connected to the network, the deployment API allows a datacenter manager to control execution of the method, and the server acts both as a HTTP proxy for the deployment API, and a DHCP server for the networking apparatus.

In yet another embodiment, the server maintains a copy of each operating system and associated packages within the range of available and supported operating system versions.

In yet another embodiment, the server maintains a copy of the script file.

In yet another embodiment, the server maintains a copy of the configuration file.

In yet another embodiment, the script file implements an abstraction layer, an internal API and code interfacing with the networking apparatus, such that the abstraction layer may be generic, and only the code interfacing with the networking apparatus be specific to it.

In yet another embodiment, a step c'- is introduced between steps c- and d-, described above, of downloading on the networking apparatus a copy of each operating system version file available from the server, and information about such version file, so as to obtain a view of the range of available and supported operating system versions.

In yet another embodiment, various implementations of the present technology provide a system for deploying in a datacenter connected to a network a networking apparatus equipped with Auto Provisioning Mode capability, and having an installed version of operating system and associated packages, the system comprising:

a processor;
a non-transitory computer-readable medium, the non-transitory computer-readable medium comprising control logic which upon being executed by the processor causes:
  a- defining a targeted version of operating system and associated packages qualified for the datacenter;
  b- maintaining a range of available and supported operating system versions, including the targeted version of operating system, and associated packages;
  c- connecting to the network, and powering-on the networking apparatus;
  d- comparing the version of operating system installed on the networking apparatus with the targeted version of the operating system:
    (i) if the installed version of operating system matches the targeted version of the operating system:
  verifying that the list of names of installed packages matches exactly the list of names of packages associated with the targeted version of operating system and qualified for the datacenter, and if not, installing packages associated with the targeted version of the operating system, rebooting the networking apparatus in Auto Provisioning Mode and repeating step d-, otherwise rebooting the networking apparatus in operational mode within the datacenter;
    (ii) if the installed version of operating system is newer than the targeted version of the operating system: installing on the networking apparatus the next version down of operating system within the range of supported operating systems, rebooting the networking apparatus in Auto Provisioning Mode and repeating step d-; and
    (iii) if the installed version of operating system is older than the targeted version of the operating system: installing on the networking apparatus the next version up of operating system within the range of supported operating systems, rebooting the networking apparatus in Auto Provisioning Mode and repeating step d-.

Implementations of the present technology each have at least one of the above mentioned object and/or aspects, but do not necessarily have all of them.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that, unless otherwise explicitly specified herein, the drawings are not to scale. Finally, elements that are identical from one drawing to the other bear the same numeral reference across drawings.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a «networking apparatus» or «server», may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). In the aforementioned, explicit use of the term a «processor» should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

The latest networking apparatus deployed in a datacenter feature a capability for automated and centralized provisioning and configuration, allowing to improve reliability and minimizing bring-up costs when deploying additional apparatus and growing the network.

Such capability is for example marketed under the acronyms «ZTP» for «Zero Touch Provision», or «POAP» for «PowerOn Auto Provision». It is found respectively in networking apparatus such as Arista 7100 and Cisco Nexus 3000 amongst others. It will be generically designated hereafter as «Auto Provisioning Mode».

Figure 1:
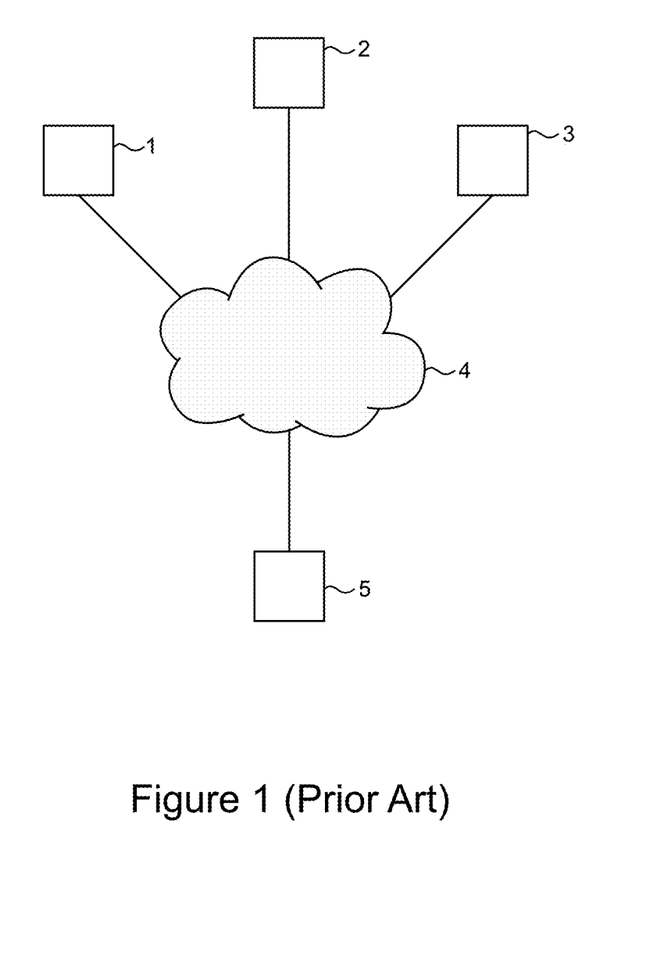
FIG. 1 (Prior art) illustrates elements and functions involved in Auto Provisioning Mode.

At its core, Auto Provisioning Mode involves the elements and functions described in relation to FIG. 1 (Prior Art). A DHCP Server 1, a Script Server 2, and a Software Server 3 are all connected to a Network 4. Note that this is a logical view, and all server functionalities could physically reside in a single physical server.

When a new Networking Apparatus 5, pre-loaded with an operating system and packages, is being hooked up to Network 4, the following steps occur:

step 1: at power-on, Networking Apparatus 5 internally seeks a configuration file;

step 2: since it does not locate one, Networking Apparatus 5 enters the Auto Provisioning Mode, and remains non-operational in Network 4;

step 3: it locates DHCP Server 1 externally, and bootstraps itself with its interface IP address, gateway, and DNS server IP addresses; it also obtains the IP address (TFTP type server) or the URL (HTTP type server) of Script Server 2;

step 4: it downloads a script file from Script Server 2, and runs it;

step 5: the script file commands get Networking Apparatus 5 to download and install a software image (operating system and packages) and configuration file available from Software Server 3; step 6: Networking Apparatus 5 reboots, locates its configuration file, and thus does not enter the Auto Provisioning Mode, and becomes operational in Network 4.

Variants exist between ZTP and POAP in implementation details, without affecting the generality for the definition of Auto Provisioning Mode given above. Further, ample public documentation is available by vendors of networking apparatus, and detailing the functioning of Auto Provisioning Mode (for example by Cisco for POAP, the guide:«*Nexus 3000 Series NX-OS Fundamentals Configuration Guide, Release 5.0(3)U3(1)*», section«Using PowerOn Auto Provisioning»).

A problem however affects the ability of Auto Provisioning Mode to truly achieve automated installation of Networking Apparatus 5 in all instances: the operating system and packages pre-loaded on Networking Apparatus 5 coming out of factory (or refurbished), may be at a version such that attaining the version of operating system and packages qualified for the network, as «targeted version» hereafter, whether as an upgrade or downgrade compared to pre-loaded version, may not be possible through one pass only of installing the software image and configuration file from Software Server 3 (step 5 above). Indeed, going from pre-loaded version to targeted version may require installation of intermediary versions of operating system and packages.

In addition, since the pre-loaded version of operating system and packages installed on Networking Apparatus 5 may not be known, or not be known for all networking apparatus deployed simultaneously with Networking Apparatus 5, systematically using the Auto Provisioning Mode for all deployed networking apparatus may lead to certain of them not being able to achieve automated upgrade/downgrade, thus remaining in a non-operational state, and requiring manual intervention to upgrade/downgrade their operating system and packages to the targeted version, before they can be operational.

The invention remedies the drawbacks associated with systematic use of Auto Provisioning Mode when deploying networking apparatus in a network. It is described in details here in relation to a networking apparatus of the type Cisco *Nexus* 3000, but the person skilled in the art will appreciate that it equally applies to any piece of equipment that features the Auto Provisioning Mode as described above.

Figure 2:
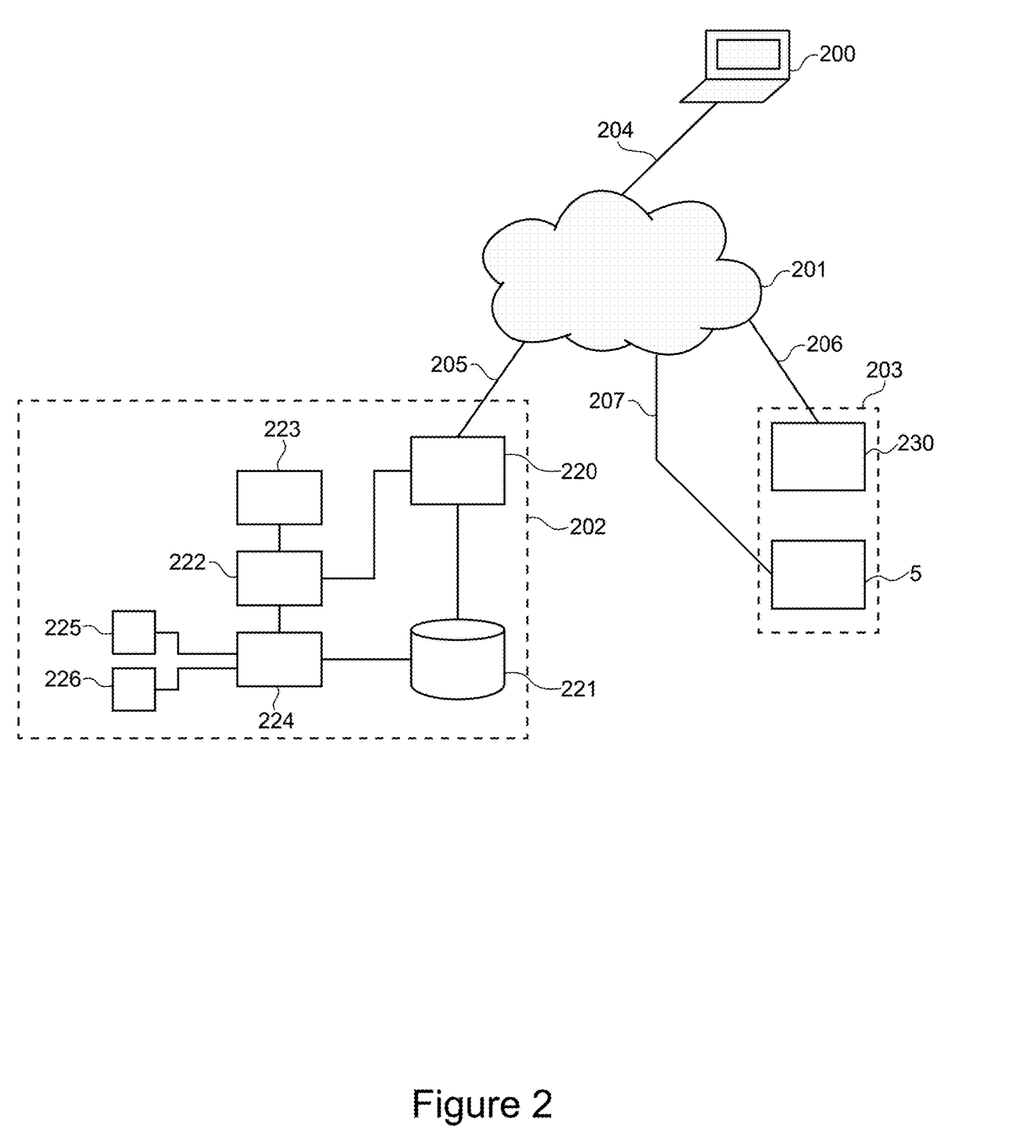
FIG. 2 illustrates the infrastructure deployed according to the invention.

The infrastructure deployed according to the invention is described in relation to FIG. 2. A datacenter manager 200 is connected through links 204, network 201, and links 205 to 207 respectively to a backend 202 and a datacenter 203. HTTPS protocol may be enabled on links 204 to 207. The person skilled in the art will appreciate that this description is generic and logical, and that in reality part or all of datacenter manager 200, network 201, backend 202 and datacenter 203 may reside in physical proximity.

Backend 202 will now be described in more details. A deployment Application Programming Interface «API» 220 provides a REST-type of API, through which datacenter manager 200 may access a database 221 to maintain the deployment tasks, and a message broker 222 such as Redis. Other components include a task scheduler 223 such as Celery schedules, and a task execution module 224 such as Celery workers. Task execution module 224 in particular runs tasks to generate names (such as hostname and domain name) and configuration for any deployed networking apparatus. Task execution module 224 connects to workflow service 225, such as OpenStack Mistral, and configuration management database 226 through internal APIs to update and collect information in relation to such deployed networking apparatus. The person skilled in the art will appreciate that backend 202 and more particularly deployment API 220 enable datacenter manager 200 to control execution of the method according to the invention.

Datacenter 203 will now be described in more details, in which Networking Apparatus 5, with Auto Provisioning Mode capability, is being deployed. A server 230 acts both as a HTTP proxy for deployment API 220, and a DHCP server for Networking Apparatus 5. In the former capacity, server 230 allows Networking Apparatus 5 to collect its configuration file at the end of the provisioning process (step 6 described above). In the latter capacity, it allows Networking Apparatus 5 to download both the script file to be executed (step 4 described above, and the software image for the operating system and the packages (step 5 described above). As such, and in a particular embodiment of the invention, server 230 acts as both Script Server 2 and Software Server 3 as described above.

In one embodiment of the invention, server 230 may be used as a cache for the software image, so as to avoid having to send such image to Datacenter 203 upon each subsequent additional deployment of networking apparatus.

Figure 3:
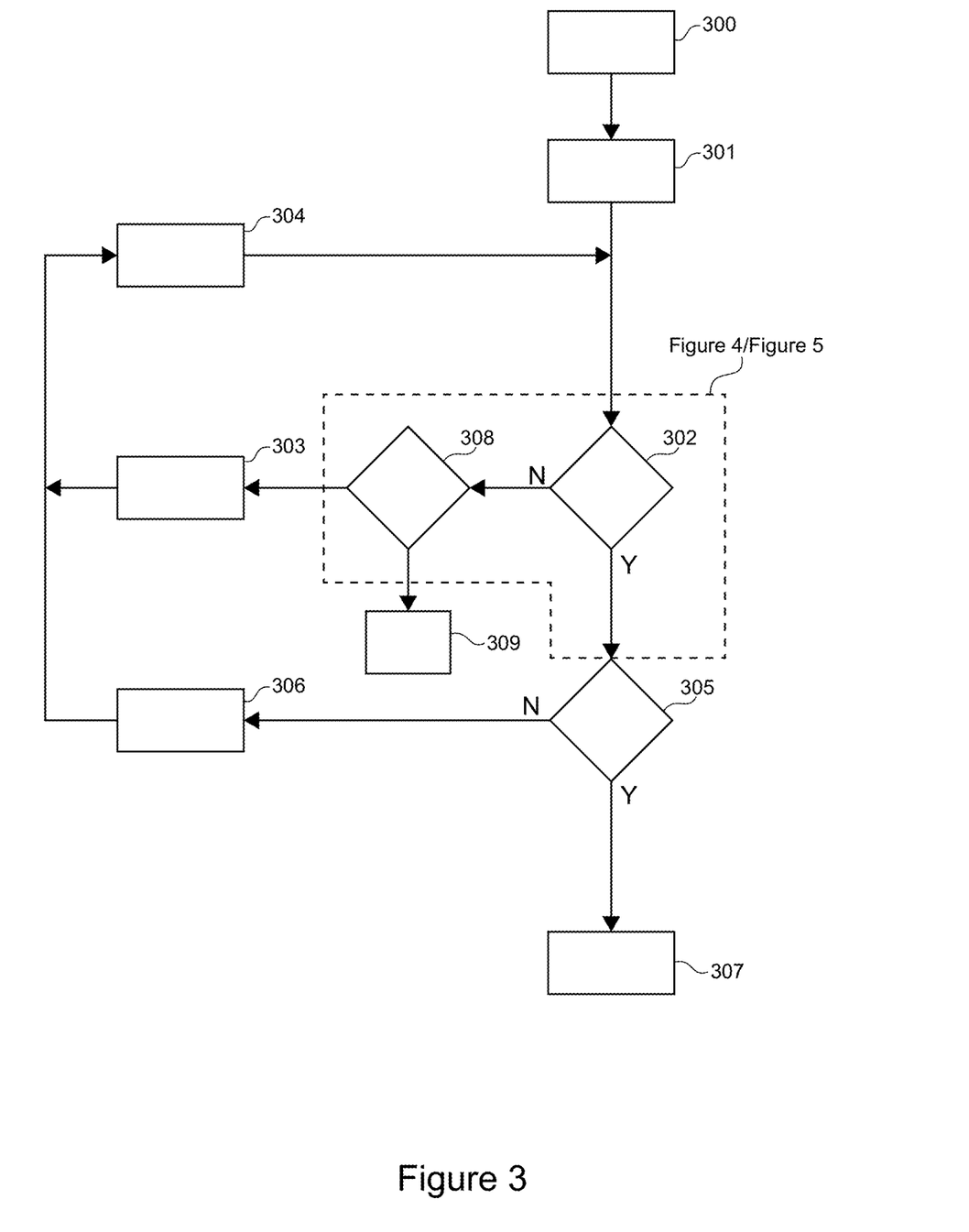
FIG. 3 illustrates the improved automated software update process according to the invention.

Upon deployment of Networking Apparatus 5 the following steps occur:
- datacenter manager 200 enters and identifies Networking Apparatus 5 in deployment API 220, as a piece of equipment to be deployed in datacenter 203;
- workflow service 225 is contacted for any workflows specific to the deployed Networking Apparatus 5, such as necessary IP addresses;
- task execution module 224 gathers all information necessary for the deployment, and configuration file and names for Networking Apparatus 5 are generated;
- Networking Apparatus 5 is powered-on and initiates the improved automated software update process according to the invention, more fully described in relation to FIG. 3;
- once Networking Apparatus 5 is fully updated to the targeted version of software for datacenter 203 and configured: workflow service 225 is contacted once more for any workflows specific to deployment validation, and necessary updating of all other levels of the infrastructure of datacenter 203; and
- the deployment task of Networking Apparatus 5 is noted as executed in deployment API 220.

In relation to FIG. 3, the improved automated software update process according to the invention is described, as applied to Networking Apparatus 5. At step 300, Networking Apparatus 5 is hooked-up in datacenter 203 and powered-on.

So as to be able to install on Networking Apparatus 5 a targeted version of operating system and packages according to what has been qualified for datacenter 203, starting from an unknown currently installed version on Networking Apparatus 5:
- deployment API 220 maintains information about all available and supported operating system versions (as «range of supported versions» hereafter), the targeted version, as one within the range of supported versions, and all packages at a version compatible with each version within the range of supported versions;
- server 230 maintains a copy of all the aforementioned operating systems and packages, in all different versions.

Since Networking Apparatus 5 possesses the Auto Provisioning Mode capability and does not locate internally a configuration file, and at step 301:
- Networking Apparatus 5 uses DHCP to obtain IP addresses and send requests;
- server 230, following DHCP procedure, specifies the script file to be downloaded depending on Networking Apparatus 5 currently installed operating system, for example NX-OS (Cisco equipment) or EOS (Arista equipment);

the script gets executed by Networking Apparatus 5:
- detecting the presence or absence of vendor-specific libraries, such as python libraries, allows to infer the type of equipment Networking Apparatus 5 is;
- through execution of virtual routing and forwarding, access to the deployment API 220 is established;
- model, version and serial number of Networking Apparatus 5 are collected from within, and the serial number is used to confirm with deployment API 220 that Networking Apparatus 5 needs to be deployed in datacenter 203;

upon such confirmation:
- Networking Apparatus 5 downloads from deployment API 220 the file for its intended configuration;
- all packages and versions available from server 230 are downloaded on Networking Apparatus 5; in one embodiment of the invention, md5 sum is used to calculate and verify MD5 hashes of downloaded files with MD5 hashes for these files made available by deployment API 220;
- each operating system version file available from server 230 is in turn downloaded on Networking Apparatus 5, information about the version of the operating system collected, then the file gets erased from Networking Apparatus 5, allowing to free up memory space on Networking Apparatus 5; thus Networking Apparatus 5 gets a view of the range of supported versions;
- finally, Networking Apparatus 5 determines how the currently installed version of the operating system compares with all the versions successively downloaded and fits within the range of supported versions, and is able to derive the path of upgrading/downgrading it should follow to go from currently installed version to targeted version.

At this stage, Networking Apparatus 5 is still in Auto Provisioning Mode.

At step 302, it is determined whether the operating system version currently installed on Networking Apparatus 5 matches the targeted version for datacenter 203: if not, at step 308 decision is made of the next version to install among the range of supported versions. If none is available the process is stopped at step 309;

At step 303, installation of the version of the operating system decided at step 308 within the range of supported versions, whether upgrade or downgrade, is made, and the internal configuration file is erased.

At step 304 Networking Apparatus 5 is rebooted and set into Auto Provisioning Mode (for example through erasing the configuration file, or forcing the rebooting in that mode).

If, on the other hand, at step 302, determination is made that the currently installed version of the operating system is the targeted version, then at step 305, verification (through internal commands available in Networking Apparatus 5) is made that the list of names of installed packages matches exactly the list of names of packages targeted in datacenter 203 for the targeted version of operating system; if not, the next intermediary version of packages between installed and targeted gets installed at step 306, and Networking Apparatus 5 reboots in Auto Provisioning Mode at step 304.

Steps 302 and 305 are thus repeated until it is determined that the version of both operating system and packages installed on Networking Apparatus 5 matches the targeted versions for datacenter 203: in which case, at step 307:
- the script file commands get Networking Apparatus 5 to run the file for intended configuration and configure it;
- Networking Apparatus 5 notifies deployment API 220 that it is up and running in datacenter 203.

In one embodiment, the script file implements an abstraction layer and an internal API between the abstraction layer and the code interfacing with the specific Networking Apparatus 5, for example Arista 7100 or Cisco Nexus 3000.

This allows to have the latter code only be specific to the piece of equipment, to achieve functions such as installing software on, and configuring, Networking Apparatus 5, gathering pieces of information such as its serial number, hardware model, software version, etc., while code generic to all types of equipment may be written for the higher logic described above in relation to FIG. 3.

Figure 4:
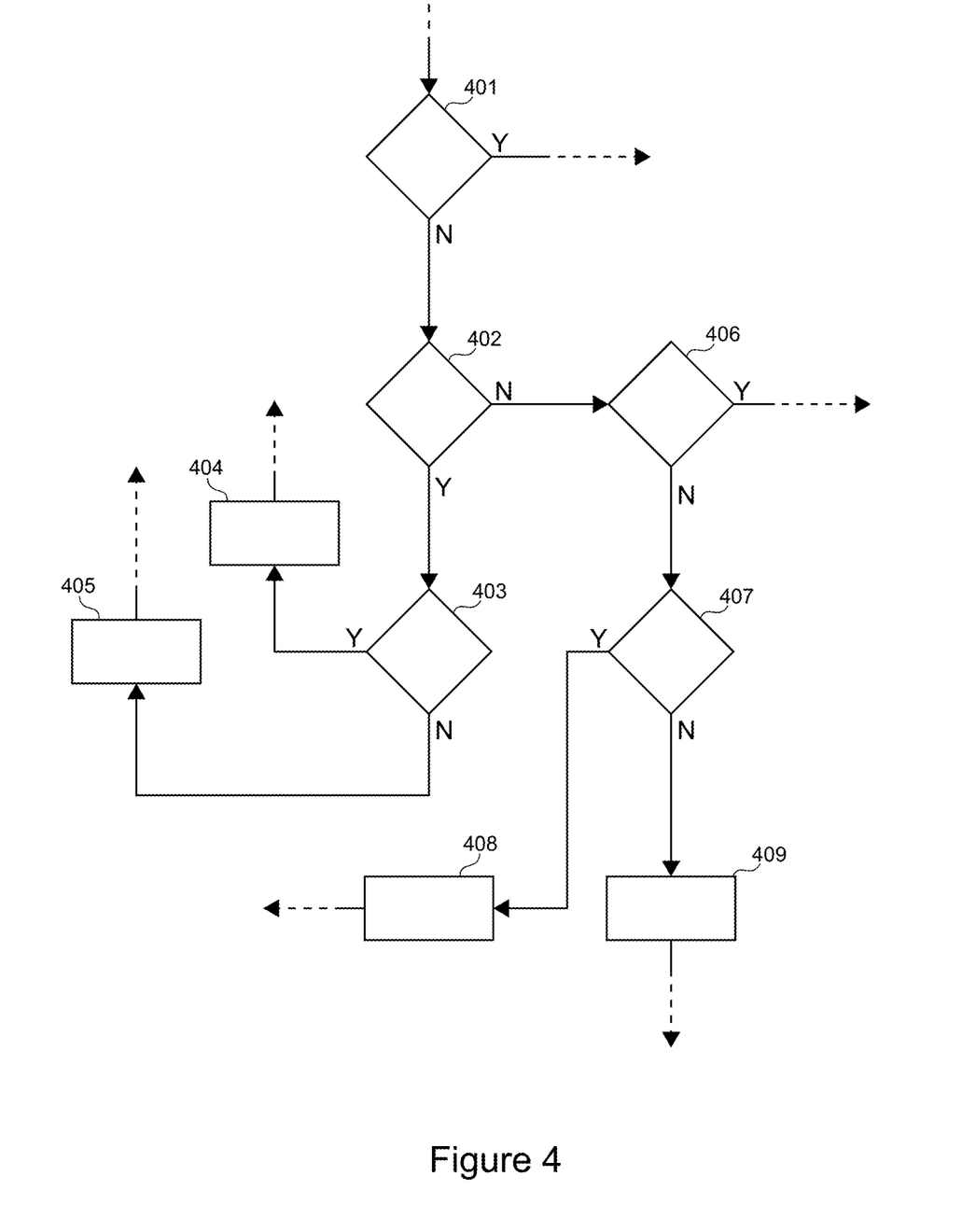
FIG. 4 details the process of upgrade/downgrade decision making of software version according to the invention.

The way Networking Apparatus 5 decides the path of upgrading/downgrading of operating system it should follow to go from currently installed version to targeted version, is detailed hereafter, in relation to FIG. 4. It is a detailed view of steps 302 and 308 of FIG. 3.

It is done in the commonly used software versioning scheme using sequence-based identifiers, also called semantic versioning, but it will appear to the person skilled in the art that other versioning schemes could also be used and exploited by Networking Apparatus 5 without departing from the scope of the invention.

A unique number will be assumed to be assigned to each version of operating system, composed of 3 categories, from left (major) to middle (minor), to right (patch), with, in each category, a number, for example 7.1.1.

In each category, numbers are assigned in increasing order, combined as the case may be with a letter assigned in alphabetical order, corresponding to the newest development of the operating system.

The comparison of version numbers is done category by category, with priority given to left (major) over right (patch). For example 6.1.3 corresponds to a newer version than 6.1.2, but 7.1.2 corresponds to a newer version than 6.1.3.

As explained above the range of available and supported operating system versions is available information at deployment API 220, and such versions are available from server 230. The information of the targeted version for datacenter 203 is also available at deployment API 220, within the range of supported versions.

At step 401, determination is made whether the currently installed operating system version («installed version» hereafter) matches the targeted version: if it does, a branch is made to step 305 on FIG. 3.

If not, at step 402, a test is made whether the installed version is older than the targeted version (upgrade necessary):
- if it is, at step 403, determination is made whether the installed version is older than the oldest version in the range of supported versions:
  - if it is, at step 404, the installed version is decided to be replaced in Networking Apparatus 5 with the oldest version in the range of supported versions, and the process branches to step 303 of FIG. 3 (installation of the decided replacement operating system);
  - if not, at step 405, the installed version is decided to be replaced in Networking Apparatus 5 with the next newer version down in the range of supported versions, and the process branches to step 303 of FIG. 3 (installation of the decided replacement operating system).

If, at step 402, the installed version is newer than the targeted version (downgrade necessary):
- at step 406, determination is made whether the number in the major category of the installed version is higher than the number in the major category of the newest version in the range of supported versions:
  - if it is, the process is stopped, and a branch made to step 309 on FIG. 3; this is to not risk having Networking Apparatus 5 deployed with an operating system that is incompatible with that qualified for datacenter 203;
  - if not, at step 407, determination is made whether the installed version is newer than the newest version in the range of supported versions:
    - if it is, at step 408, the installed version is decided to be replaced in Networking Apparatus 5 with the newest version in the range of supported versions, and the process branches to step 303 of FIG. 3 (installation of the decided replacement operating system);
    - if not, at step 409, the installed version is decided to be replaced in Networking Apparatus 5 with the next older version up in the range of supported versions, and the process branches to step 303 of FIG. 3 (installation of the decided replacement operating system).

For the sake of illustration through example, the following scenario will be assumed: deployment API 220 and server 230 maintain information about, and make available the following operating system versions: 6.1.1, 6.1.3, 7.1.0, 7.1.1, 7.2.1 and 7.2.3, and information that the targeted version is 7.1.1. The following table may be drawn up to illustrate the operating system installation process and the installation decision making by Networking Apparatus 5:

| Currently installed operating system version | Next installed version by Networking Apparatus 5 |
| --- | --- |
| 6.1.0 | 6.1.1 |
| 6.1.1 | 6.1.3 |
| 6.1.2 | 6.1.3 |
| 6.1.3 | 7.1.0 |
| 7.1.0 | 7.1.1 (targeted version) |
| 7.1.1 | No installation necessary |
| 7.2.1 | 7.1.1 (targeted version) |
| 7.2.3 | 7.2.1 |
| 7.2.4 | 7.2.3 |
| 8.0.1 | None - process stops |

Next version installation is repeated by Networking Apparatus 5 until the currently installed version of the operating system becomes the targeted version (7.1.1).

Figure 5:
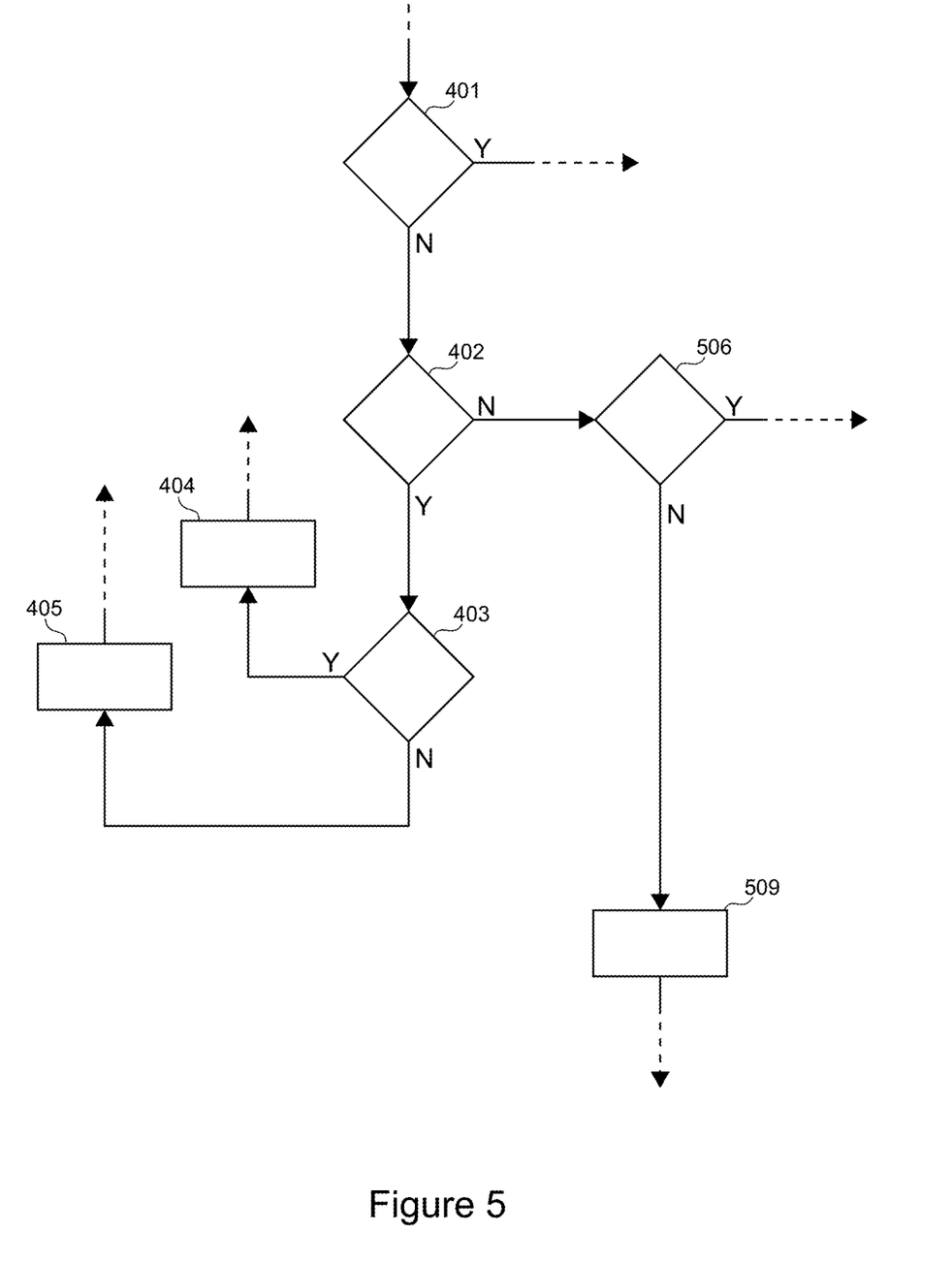
FIG. 5 details the process of upgrade/downgrade decision making of software version according to an alternate embodiment of the invention.

In an alternate embodiment of the invention, and as illustrated FIG. 5, the process is as described in relation to FIG. 4, except that steps 406 to 409 are replaced with the following:

If, at step 402, the installed version is newer than the targeted version (downgrade necessary):
- at step 506, determination is made whether the installed version is newer than the newest version in the range of supported versions:
  - if it is, the process is stopped, and a branch made to step 309 on FIG. 3; this is to risk even less than as in relation to the process described FIG. 4, having Networking Apparatus 5 deployed with an operating system that is incompatible with that qualified for datacenter 203;

if not, at step 509, the installed version is decided to be replaced in Networking Apparatus 5 with the next newer version down in the range of supported versions, and the process branches to step 303 of FIG. 3 (installation of the decided replacement operating system).

In the aforementioned semantic versioning, letters could be added by network apparatus vendors in the unique version number, for example 7.14e.23b. In that case, and as necessary for a comparison between version numbers, letters and numbers are grouped separately in order to do an alphanumerical comparison (ie: a comparison in which, contrary to an alphabetical comparison, «2» is smaller than «12»). For example:

| 7.14e.23b | 7 | 14 | e | 23 | b |
|---|---|---|---|---|---|

The comparison is done from left (major version) to right (minor/patch version). The first inequality determines the higher/newer version. For example:

| 7.14e.23b | 7 | 14 | e | 23 | b |
|---|---|---|---|---|---|
| 7.14e.25a | 7 | 14 | e | 25 | a |

7.14e.25a is the higher/newer version.

| 7.14e.23b | 7 | 14 | e | 23 | b |
|---|---|---|---|---|---|
| 7.14e.23  | 7 | 14 | e | 23 |   |

7.14e.23b is the higher/newer version.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of deploying in a datacenter connected to a network a networking apparatus equipped with Auto Provisioning Mode capability, and having an installed version of operating system and associated packages, comprising the steps of:
- a- defining a targeted version of operating system and associated packages qualified for the datacenter;
- b- maintaining a range of available and supported operating system versions, including the targeted version of operating system, and associated packages;
- c- connecting to the network, and powering-on the networking apparatus;
- d- comparing the version of operating system installed on the networking apparatus with the targeted version of the operating system:
  - (i) if the installed version of operating system matches the targeted version of the operating system: verifying that the list of names of installed packages matches exactly the list of names of packages associated with the targeted version of operating system and qualified for the datacenter, and if not, installing packages associated with the targeted version of the operating system, rebooting the networking apparatus in Auto Provisioning Mode and repeating step d-, otherwise rebooting the networking apparatus in operational mode within the datacenter;
  - (ii) if the installed version of operating system is newer than the targeted version of the operating system: installing on the networking apparatus the next version down of operating system within the range of supported operating systems, rebooting the networking apparatus in Auto Provisioning Mode and repeating step d-; and
  - (iii) if the installed version of operating system is older than the targeted version of the operating system: installing on the networking apparatus the next version up of operating system within the range of supported operating systems, rebooting the networking apparatus in Auto Provisioning Mode and repeating step d-.

2. The method of claim 1, wherein step d- further includes the step between the steps d-(i) and d-(ii):
- (i') if the installed version of operating system is newer than the newest version of operating system within the range of supported operating systems, stopping the deployment method and setting networking apparatus in non-operational mode within the datacenter.

3. The method of claim 2, wherein networking apparatus implements semantic versioning of operating systems, with version numbers comprising several categories, one of which being a major, and comparison of versions is done category by category, and wherein a newer version in step d-(i') is a version which has a number in the major category which is higher than the number in the major category of the newest version of operating system within the range of supported operating systems.

4. The method of claim 1, wherein step d- is executed by a script file loaded onto the networking apparatus.

5. The method of claim 1, wherein the step of rebooting the networking apparatus in operational mode includes loading onto the networking apparatus a configuration file for a configuration qualified for the datacenter.

6. The method of claim 1, wherein a deployment API and a server are connected to the network, and wherein the deployment API allows a datacenter manager to control execution of the method, and the server acts both as a HTTP proxy for the deployment API, and a DHCP server for the networking apparatus.

7. The method of claim 1, wherein the server maintains a copy of each operating system and associated packages within the range of available and supported operating system versions.

8. The method of claim 4, wherein the server maintains a copy of the script file.

9. The method of claim 5, wherein the server maintains a copy of the configuration file.

10. The method of claim 4, wherein the script file implements an abstraction layer, an internal API and code interfacing with networking apparatus, such that the abstraction layer may be generic, and only the code interfacing with networking apparatus be specific to it.

11. The method of claim 7, wherein a step c'- is executed between steps c- and d-:
- downloading on the networking apparatus a copy of each operating system version file available from the server, and information about such version file, so as to obtain a view of the range of available and supported operating system versions.

12. A system for deploying in a datacenter connected to a network a networking apparatus equipped with Auto Provisioning Mode capability, and having an installed version of operating system and associated packages, the system comprising:
- a processor;
- a non-transitory computer-readable medium, the non-transitory computer-readable medium comprising control logic which upon being executed by the processor causes:
  - a- defining a targeted version of operating system and associated packages qualified for the datacenter;
  - b- maintaining a range of available and supported operating system versions, including the targeted version of operating system, and associated packages;
  - c- connecting to the network, and powering-on the networking apparatus;
  - d- comparing the version of operating system installed on the networking apparatus with the targeted version of the operating system:
    - (i) if the installed version of operating system matches the targeted version of the operating system:
    - verifying that the list of names of installed packages matches exactly the list of names of packages associated with the targeted version of operating system and qualified for the datacenter, and if not, installing packages associated with the targeted version of the operating system, rebooting the networking apparatus in Auto Provisioning Mode and repeating step d-, otherwise rebooting the networking apparatus in operational mode within the datacenter;
    - (ii) if the installed version of operating system is newer than the targeted version of the operating system: installing on the networking apparatus the next version down of operating system within the range of supported operating systems, rebooting the networking apparatus in Auto Provisioning Mode and repeating step d-; and
    - (iii) if the installed version of operating system is older than the targeted version of the operating system: installing on the networking apparatus the next version up of operating system within the range of supported operating systems, rebooting the networking apparatus in Auto Provisioning Mode and repeating step d-.

13. The system of claim 12, wherein step d- further includes the step between the steps d-(i) and d-(ii')
   (i) if the installed version of operating system is newer than the newest version of operating system within the range of supported operating systems, stopping the deployment method and setting networking apparatus in non-operational mode within the datacenter.

14. The system of claim 13, wherein networking apparatus implements semantic versioning of operating systems, with version numbers comprising several categories, one of which being a major, and comparison of versions is done category by category, and wherein a newer version in step d-(i') is a version which has a number in the major category which is higher than the number in the major category of the newest version of operating system within the range of supported operating systems.

15. The system of claim 12, wherein step d- is executed by a script file loaded onto the networking apparatus.

16. The system of claim 12, wherein the step of rebooting the networking apparatus in operational mode includes loading onto the networking apparatus a configuration file for a configuration qualified for the datacenter.

17. The system of claim 12, wherein a deployment API and a server are connected to the network, and wherein the deployment API allows a datacenter manager to control execution of the method, and the server acts both as a HTTP proxy for the deployment API, and a DHCP server for the networking apparatus.

18. The system of claim 12, wherein the server maintains at least one of (i) a copy of each operating system and associated packages within the range of available and supported operating system versions, (ii) a copy of the script file and/or (iii) a copy of the configuration file.

19. The system of claim 14, wherein the script file implements an abstraction layer, an internal API and code interfacing with networking apparatus, such that the abstraction layer may be generic, and only the code interfacing with networking apparatus be specific to it.

20. The system of claim 18, wherein a step c'- is executed between steps c- and d-:
   downloading on the networking apparatus a copy of each operating system version file available from the server, and information about such version file, so as to obtain a view of the range of available and supported operating system versions.

* * * * *

UNITED STATES PATENT AND TRADEMARK OFFICE
CERTIFICATE OF CORRECTION

PATENT NO. : 10,860,313 B2
APPLICATION NO. : 16/540129
DATED : December 8, 2020
INVENTOR(S) : Maxime Monet et al.

Page 1 of 1

It is certified that error appears in the above-identified patent and that said Letters Patent is hereby corrected as shown below:

In the Claims

Column 14, Claim 13, Line 2 should read --includes the step between the steps d-(i) and d-(ii)--

Column 14, Claim 13, Line 3 should read --(i') if the installed version of operating system is newer--

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*